United States Patent [19]

Mailänder

[11]  4,322,143
[45]  Mar. 30, 1982

[54] ELECTRONIC FLASH FOR A CAMERA

[75] Inventor: Manfred Mailänder, Röinghausen, Fed. Rep. of Germany

[73] Assignee: Balda-Werke, Bunde, Fed. Rep. of Germany

[21] Appl. No.: 52,414

[22] Filed: Jun. 27, 1979

[51] Int. Cl.³ ............................................. G03B 15/03
[52] U.S. Cl. ...................................... 354/32; 354/145
[58] Field of Search ........................ 354/32, 33, 34, 35, 354/60 F, 145

[56] References Cited
U.S. PATENT DOCUMENTS 4,084,167  4/1978  Iwata ............................... 354/145 X
4,086,582  4/1978  Kiyohara et al. ............... 354/145 X Primary Examiner—Michael L. Gellner
Attorney, Agent, or Firm—Howard I. Schuldenfrei

[57]  ABSTRACT

An improved flasher wherein power input to the charging circuit thereof is automatically cut-off when the device is ready to flash including a two-way switching member and an electromagnet which cooperate to form a relay for controlling current feed to the flasher circuit high-voltage capacitor as a function of the condition of charge thereof, the electromagnet being concomitantly controlled by a charge indicator as a corresponding function of the voltage present thereon.

5 Claims, 4 Drawing Figures

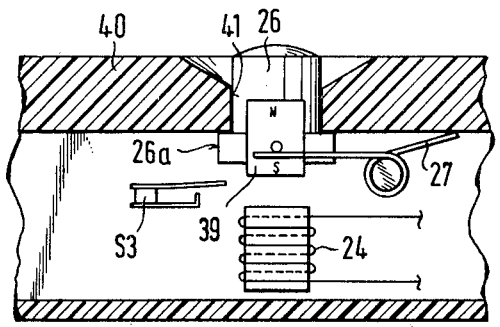
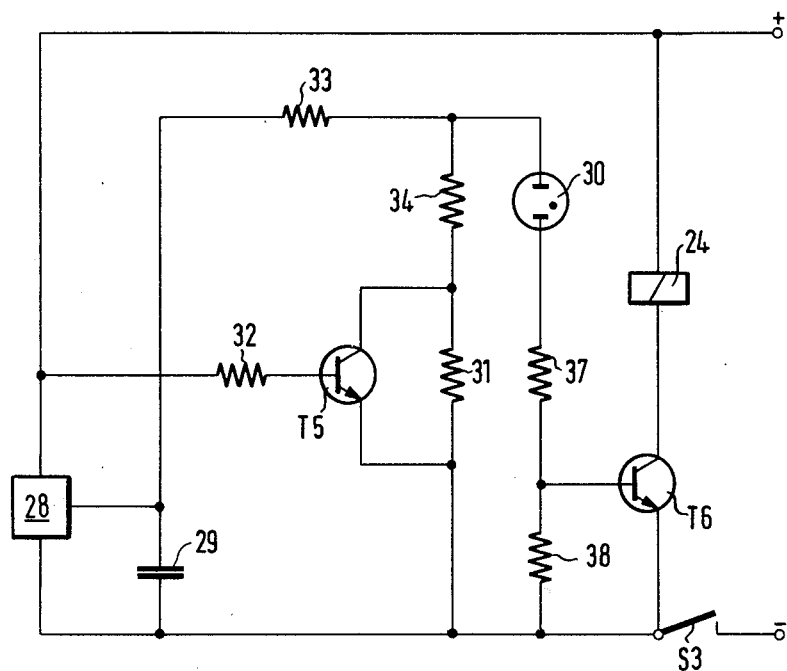
Fig. 3
Fig. 4

ELECTRONIC FLASH FOR A CAMERA

BACKGROUND OF THE INVENTION

The present invention relates to an improved electronic flasher for a camera having means for automatically cutting power input to the charging circuit thereof when the device is prepared to flash and, as desired, having means for determining whether flashing is required for picture taking under the prevailing ambient conditions. The instant invention is suited to conventional cameras having built-in electronic flash units as well as cameras adapted to receive demountable flash units.

Conventionally, electronic flash units are activated or deactivated by a manual two-way switch having ON-OFF power input settings. There is a finite time lapse between the instant the devide is activated and the instant the device is charged to a condition of flash readiness. Since the device is either incapable of producing a sufficiently luminescent flash or incapable of producing any flash until adequately charged, an indicating means, such as a glow lamp is usually associated with the charging circuit thereof for the purpose of signaling when the device has reached a condition of flash readiness.

Illumination of the glow lamp is a positive indication that the high-voltage capacitor conventionally connected in the flash charging circuit has reached the given minimum condition of charge required for flashing. Retention of the minimum charge necessary for flashing these conventional devices requires continuous charging of the unit until the instant of flashing. After flashing, the charging process is immediately recommenced unless the device is shut-off.

These flasher devices are battery operated and because of their continuous mode of operation, the batteries employed therein have a short useful life. Rapid deterioration of the batteries used in these devices occurs because the devices are customarily maintained in their flash-readiness positions for long periods of time, without being flashed.

Accordingly, the flasher devices constructed according to the instant invention are provided with a power cut-off which is automatically actuated when the device is capable of being suitably flashed.

SUMMARY OF THE INVENTION

Generally speaking, in accordance with the invention, an improved electronic flasher for a camera is provided which includes a means for automatically cutting the power input to the charging circuit thereof when the device is ready to flash. This improved flasher includes a charging circuit actuated by a two-way switching means which is automatically returned to its OFF position when the flasher unit is flashed. The invention is suited to flasher units of the type having a high-voltage capacitor included in the charging circuit thereof which is required to be sufficiently charged to effect flashing.

An improved flasher constructed according to this invention includes a two-way switching means and an electromagnet which cooperate to form a relay for controlling current feed to a flasher circuit high-voltage capacitor as a function of the condition of charge thereof, the electromagnet being concomitantly controlled by a charge indicating means as a corresponding function of the voltage present thereon. According to one preferred embodiment of the invention, automatic return of the two-way switching means is effected by, inter alia, providing the two-way switching means with a permanent magnet having the same polarity as the electromagnet, and being repelled thereby, when the charge indicating means affirmatively responds. According to another preferred embodiment of the invention, the two-way switching means includes an armature which is withdrawn from the electromagnet after the device is flashed and, concomitantly, after the charge indicating means has affirmatively responded.

Another aspect of the invention relates to the particularly satisfactory mode of operation of the improved flasher when the two-way switching means is utilized as a test key and the flasher circuit includes an improved test circuit comprising a conventional test circuit which is modified to include an additional ON-OFF switch, a photoelectric cell, a trigger circuit and an electro-optical indicating device. Another feature which is ancillary to this aspect of the invention is the mode of charging the high-voltage capacitor included in the flasher charging circuit which is arranged so that it is charged as a function of the resistance of the photoelectric cell.

Accordingly, it is an object of this invention to provide an improved electronic flash device for a camera which is adapted to be built-in to the camera or integrally connected thereto.

Another object of the invention is to provide an improved electronic flash device for a camera which prolongs the useful life of batteries employed therein as a power source and includes means for determining whether the ambient conditions require flashing for picture taking.

A further object of the invention is to provide an improved electronic flash device for a camera which has means for automatically cutting the power input thereto upon flashing.

Still another object of the invention is to provide an improved electronic flash device having a charging circuit actuated by a two-way switching means which is automatically returned to its OFF position when the device is sufficiently charged to flash.

Still other objects and advantages of the invention will in part be apparent from the specification.

The invention accordingly comprises the features of construction, combinations of elements and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which:

FIG. 3 is a fragmentary detail view of a section of another electronic flasher constructed in accordance with the invention in which an alternative embodiment of a two-way switching means is employed; and FIG. 4 is a schematic diagram of a charging circuit for the improved electronic flasher in which the two-way switching means seen in FIG. 3 is employed.

DETAILED DESCRIPTION OF THE INVENTION

Figure 1:
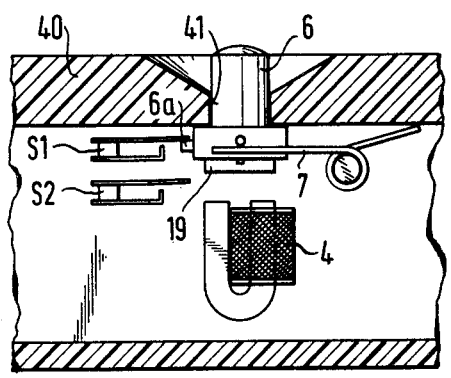
FIG. 1 is a fragmentary detail view of a section of an electronic flasher constructed in accordance with the invention having a novel two-way switching means of the type which functions as a test key in a test circuit.
Figure 2:
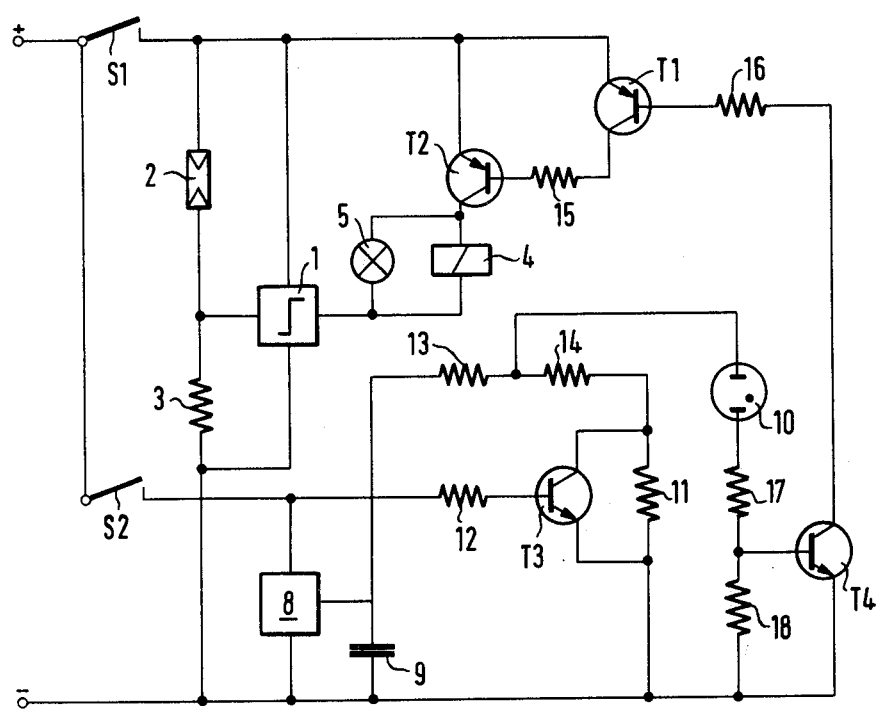
FIG. 2 is a schematic diagram of a charging circuit for the improved electronic flasher in which the two-way switching means seen in FIG. 1 is employed.

Referring now to the Drawings, the flasher embodiment depicted in FIGS. 1 and 2 includes a cylindrical switching member 6 movable in a slot 41, formed in a housing 40, between first, seen in FIG. 1, and second positions, the first and second positions thereof corresponding respectively to open and closed switch positions. The housing 40 may be a camera housing or a housing for a discrete flash attachment. Member 6 is a dual function switching member which serves as a means for closing the flasher charging circuit and as a test key for testing whether the level of ambient light in the environment of the camera requires utilization of the flash for picture taking.

Mounted on the end of member 6 extending into housing 40 is an armature 19 which is abuttable into an underlying electromagnet 4 when member 6 is manually depressed into slot 41. To depress member 6 into its second position in slot 41, sufficient downward pressure must be exerted thereon to overcome the force of a return spring 7 mounted in housing 40 which normally biases member 6 towards its first position. An arm of return spring 7 underlies a finger laterally extending from member 6 and exerts sufficient linear force thereon to return member 6 to its first position, in the absence of the application of an opposite force of greater magnitude to member 6.

As best seen in FIG. 1, a pair of switches S1 and S2 are controlled by a lip flange 6a which laterally emerges from member 6. S1 is a normally closed switch, while S2 is a normally open switch. Both switches are arranged in the path of lip flange 6a.

When member 6 is in its first or at rest position, lip flange 6a underlies and abuts the arm of switch S1 with sufficient force to open switch S1, as seen in FIG. 1. The force for opening switch S1 is provided by return spring 7. As member 6 is depressed inwardly towards its second position, lip flange 6a disengages switch S1, which then moves to its normal closed position. When member 6 is fully inwardly depressed into its second position, lip flange 6a abuts and closes switch S2, and armature 19 overlies and engages electromagnet 4.

As hereinafter described in detail, the condition of electromagnet 4, traversed by current or not, is dependent upon the ambient light conditions in the environment of the camera. When electromagnet 4 is traversed by a current, armature 19 is magnetically attracted thereto and concomitantly, member 6 is retained in its second position. The magnetic attraction between electromagnet 4 and armature 19 exceeds the force of spring 7 on member 6. On the other hand, member 6 is restored to its first position by the force of return spring 7 thereon when there is no current traversal through electromagnet 4.

The elements seen in FIG. 1 are schematically depicted in FIG. 2 in the positions shown in FIG. 1. The circuit seen in FIG. 2 includes means for determining whether the ambient light in the environment of the camera is adequate for taking a picture without a flash. This determination is functionally related to the quantity of ambient light which strikes a photoelectric cell or photoresistor 2 connected in the circuit. To arrive at this determination, member 6 is depressed between its first and second positions; whereby switch S1 is in a closed position, while switch S2 remains in an open position. The test key function of member 6 is illustrated in this intermediate positioning thereof. When switches S1 and S2 are in these respective positions, and adequate ambient light is present for picture taking without a flash, the electrical resistance of photoelectric cell or photoresistor 2 is small as compared with its condition of electrical resistance in the presence of insufficient ambient light.

The circuit seen in FIG. 2 includes a voltage divider comprising photoelectric cell 2 and resistor 3. Resistor 3 is preselected so that under circumstances where sufficient ambient light, for picture taking without flash, strikes photoelectric cell 2, a trigger circuit 1, for instance a Schmitt trigger, is blocked. This blockage prevents illumination of an in-series indicating means 5, such as an indicator bulb, and concomitantly, electromagnet 4 is not magnetically activated by a traversal of current therein.

Indicator bulb 5 does not illuminate under the circumstances heretofore described which is a positive indication to the camera operator that a successful picture may be taken without the use of a flash. Should the camera operator depress member 6 beyond its intermediate position between switches S1 and S2 into its second position, switch S2 will be closed and armature 19 may abut electromagnet 4. But under the circumstance of sufficient ambient light, as hereinbefore described, electromagnet 4 is magnetically inactive. Therefore, member 6 is restored to its first position by spring 7.

When there is insufficient ambient light for picture taking without a flash, the condition of the circuit schematically depicted in FIG. 2 is altered. As previously described, the partial depression of member 6 to an intermediate position results in the closing of switch S1, placing member 6 in test key position. However, the ohmic resistance of photoelectric cell 2 is relatively high, as compared with its resistance in the presence of adequate ambient light, the high omhic resistance thereof being a consequence of the small amount of ambient light present. Under these conditions, namely insufficient light for picture taking without a flash, current bridges trigger circuit 1, i.e. the Schmitt trigger, as a consequence of the design of the voltage divider sub-circuit consisting of photoelectric cell 2 and ohmic resistor 3 applying voltage to indicator bulb 5 and electromagnet 4. The voltage applied to indicator bulb 5 illuminates it and magnetically activates electromagnet 4.

Illumination of indicator bulb 5 is a positive indication that prevailing conditions require the use of a flash. For flashing, the operator fully depresses member 6 to its second position, closing switch S2 and abutting armature 19 into magnetically active electromagnet 4. Flashing may be effected through a conventional high voltage flasher 8 of the type which include a high-voltage capacitor 9 in the charging circuit thereof. Capacitor 9 has been shown in FIG. 2 in detail merely to facilitate the description of the invention. Neither flasher 8 nor the charging circuit therefore are shown in detail because both have been selected from the prior art.

Flasher 8 commences charging when switch S2 is closed. The base of transistor T3 has a positive potential and thus, transistor T3 has a forward mode for bridging resistor 11. Resistor 12 is merely provided as a protective resistor for transistor T3.

Under the conditions thus described, series connected resistors 13 and 14 form a voltage divider. When capacitor 9 reaches a predetermined level of charge and a corresponding capacitor voltage, a glow lamp 10 is illuminated, signaling the operator that the unit is ready to flash. Contemporaneously with illumination of glow lamp 10, transistor T4 becomes conductive as a consequence of the potential imparted to the base thereof in accordance with the relative resistance values of resistors 17 and 18, while transistor T1 is unblocked as a consequence of the negative potential exhibited on the base thereof. Additional transistor protective resistors 15 and 16, are for the purpose of respectively protecting transistors T2 and T1.

When transistor T1 is conductive, the base of transistor T2 exhibits a positive potential and performs a blocking function for the purpose of blocking current to indicator bulb 5 and electromagnet 4. The blockage of current to electromagnet 4 permits spring 7 to restore member 6 to its first position, as seen in FIG. 1. The return of member 6 to its position provides the camera operator with a second signal, namely a mechanical signal, which advises the operator that the unit has reached a condition of flash readiness. The blockage of current to electromagnet 4 and indicator bulb 5 occurs substantially contemporaneously with the illumination of glow lamp 10, signaling flash readiness. The operator is therefore provided with two (2) signals indicating flash readiness, namely an optical signal when glow lamp 10 illuminates and, substantially contemporaneously therewith, an acoustical or mechanical signal provided by the return of member 6 to its first position.

The return of member 6 to its first position reopens switches S1 and S2, and transistor T3 performs a blocking function, whereas it previously provided a current bridge. Also, the character of resistor 11 is altered; resistor 11, which is bridged in the closed circuit phase, is included in the voltage divider, together with resistors 13 and 14, in the open circuit phase. The voltage on resistors 11 and 14, which are connected in series, changes accordingly. In the absence of a charging current, capacitor 9 gradually discharges. When the voltage on capacitor 9 reduces below a predetermined level, glow lamp 10 is extinguished. Glow lamp 10 is extinguished at a substantially lower voltage level than the voltage level necessary to illuminate it, initially. This phenomenon is thought to occur because during the initial bridging of resistor 11 the voltage conditions on the voltage divider during the ON-OFF phases differ from each other. This phase difference is thought to result in an artificial hysteresis.

Referring now to FIGS. 3 and 4 which illustrate an alternate embodiment of the invention and schematically depict a circuit therefor, like parts as shown in FIGS. 1 and 2 are numbered similarly and are numerically stepped-up by an additive factor of 20. The embodiment seen in FIG. 3 differs substantially from the comparable embodiment seen in FIG. 1. For example, member 26 which corresponds to member 6 in FIG. 1 does not have a test key function, and the embodiment seen in FIGS. 3 and 4 does not include any indicator lamp corresponding to indicator bulb 5. Therefore, this embodiment does not include any means which advises the operator concerning prevailing ambient light conditions prior to picture taking. The operator's choice of using the flasher or not is purely discretionary. Accordingly, the embodiment seen in FIGS. 3 and 4 merely includes a connecting means for making the device ready to flash. The connecting means provides the flasher with sufficient charging current for flashing and stabilizes the flasher in a flash-ready condition, until the charge on high voltage capacitor 29 has diminished below a predetermined minimum value.

Referring now to FIG. 3, a cylindrical switching member 26 having a permanent magnet 39 mounted thereon is movably mounted in slot 41 formed in housing 40. Member 26 is movable between first, seen in FIG. 3, and second positions corresponding respectively to open and closed switch positions. Mounted in housing 40 is an electromagnet 24 which is aligned with member 26 and magnet 39 mounted thereon. Magnet 39 is arranged on member 26 so that its south pole is proximate and north pole distal relative to electromagnet 24. A collar 26a surrounds the edge of member 26 which descends interiorly into housing 40.

A normally open switch S3 is arranged in housing 40 in the path of collar 26a. As member 26 is depressed into its second position, collar 26a engages switch S3 until closure thereof. When member 26 reaches its second position, switch S3 is closed by collar 26a. The second position of member 26 is determined by abutment of magnet 39 into electromagnet 24. Member 26 is normally biased into its first position by a return spring 27 mounted in housing 40 which has a free arm abutting a laterally emergent finger formed on member 26.

Depression of member 26 to its second position closes switch S3, and magnet 39 is magnetically attracted to the core of electromagnet 24. The force of magnetic attraction between magnet 39 and the core of electromagnet 24 exceeds the restorative force of spring 27 on member 26. High-voltage capacitor 29, which is connected in the charging circuit of conventional flasher 28, commences charging the instant switch S3 is closed. As seen in FIG. 4, capacitor 29 is shown as removed from flasher 28, but such removal thereof is merely to facilitate the description of the embodiment. In conventional flashers of the type that may be employed herein, which includes flasher 28, capacitor 29 is conventionally connected in the charging circuit thereof.

During the flasher charging phase, while switch S3 is closed, a transistor T5 bridges resistor 31, and a voltage divider is formed by resistors 33 and 34, which correspond to resistors 13 and 14 in the embodiment seen in FIG. 2.

After capacitor 29 reaches a predetermined level of voltage, glow lamp 30 illuminates, transistor T6 becomes conductive by virtue of the voltage applied to its base as determined by the relative resistance values of resistors 37 and 38 and current is transmitted to electromagnet 24, which is thereby magnetically activated. The polarization of electromagnet 24 is opposite to that of permanent magnet 39, and magnet 39 is repelled thereby, whereby member 26 is returned to its first position by the restorative force of spring 27. Withdrawal of member 26 from its second position opens switch S3 and interrupts the flasher charging phase. Once switch S3 is opened, resistor 31, no longer bridged by transistor T5, forms a member of the voltage divider, which then comprises resistors 31, 33 and 34.

The charge on capacitor 29 begins to gradually diminish after initial illumination of glow lamp 30, unless the device is flashed. When the charge and voltage on capacitor 29 decrease, respectively, below established predetermined levels, glow lamp 30 is extinguished. The voltage level at which glow lamp 30 is extinguished is substantially lower than the voltage level at which glow lamp 30 illuminates. Therefore, the phenomenon of an artificial hysteresis is produced. Resistors 31, 32, 33, 34, 37 and 38 correspond respectively to their counterparts 11, 12, 13, 14, 17 and 18 shown in FIG. 2.

Electronic camera flashers constructed in accordance with the disclosed embodiments have demonstrated the improved results obtainable from the instant invention, particularly as regards flasher life.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An improved flash device for a camera comprising a two-way switching means movable between a first open circuit position and a second closed circuit position, biasing means normally biasing said two-way switching means to said first open circuit position, means for automatically restoring said two-way switching means to its first open circuit position from its second closed circuit position, an electromagnet operatively connected to said switching means, said electromagnet being magnetically active when said two-way switching means is in said second closed circuit position, said two-way switching means and said electromagnet being cooperable for thereby forming a relay, a conventional high-voltage flasher having a charging circuit of the type including a high-voltage capacitor and operative to commence charging when said two-way switching means is moved to its said second closed circuit position, said relay being operatively connected to said charging circuit and controlling current feed to said high-voltage capacitor therein as a function of the level of charge thereof, and a charge indicating means operatively connected to said high-voltage capacitor and said electromagnet for controlling said electromagnet as a corresponding function of voltage present on said high-voltage capacitor, said charge indicating means providing an operator of said device with a positive indication that said device is ready to flash, an armature mounted on said two-way switching means, said armature being magnetically attracted to said electromagnet when said two-way switching means is in its second closed circuit position and said electromagnet is magnetically active, said electromagnet being inactivated when said charge indicating means positively indicates that said device is ready to flash, said automatic restoring means returning said two-way switching means to its first open circuit position when said electromagnet becomes inactive, and an improved test circuit comprising, in operative connection, a two-way switch, a photoelectric cell, a trigger circuit and an electro-optic indicating means, said two-way switch of said improved test circuit being normally open and closed when said two-way switching means is moved to an intermediate position between said first and second positions thereof, said electro-optic indicating means providing an operator with a positive indication in the absence of sufficient ambient light for picture taking without a flash.

2. The device as claimed in claim 1 including a voltage divider sub-circuit comprising said photoelectric cell and an ohmic resistor connected in series therewith, said voltage divider sub-circuit providing means for bridging and blocking said trigger circuit dependent upon ambient light conditions in the environment of said camera, said photoelectric cell exhibiting relatively low resistance in the presence of sufficient ambient light for picture taking without a flash and relatively high resistance in the presence of insufficient ambient light for picture taking without a flash, said high-voltage capacitor thereby being charged as a function of the resistance of said photoelectric cell.

3. The device as claimed in claim 1 including means for blocking current to said electromagnet and said electro-optic indicating means, said means being operative to perform a blocking function when said charge indicating means provides the operator of said device with a positive indication that said device is ready to flash.

4. The device as claimed in claim 1 including means for providing an acoustical signal which indicates the return of said two-way switching means to said first open circuit position.

5. An improved flash device for a camera comprising a two-way switching means movable between a first open circuit position and a second closed circuit position, biasing means normally biasing said two-way switching means to said first open circuit position, means for automatically restoring said two-way switching means to its first open circuit position from its second closed circuit position, an electromagnet operatively connected to said switching means, said electromagnet being magnetically active when said two-way switching means is in said second closed circuit position, said two-way switching means and said electromagnet being cooperable for thereby forming a relay, a conventional high-voltage flasher having a charging circuit of the type including a high-voltage capacitor and operative to commence charging when said two-way switching means is moved to its said second closed circuit position, said relay being operatively connected to said charging circuit and controlling current feed to said high-voltage capacitor therein as a function of the level of charge thereof, and a charge indicating means operatively connected to said high voltage capacitor and said electromagnet for controlling said electromagnet as a corresponding function of voltage present on said high-voltage capacitor, said charge indicating means providing an operator of said device with a positive indication that said device is ready to flash, a permanent magnet mounted on said two-way switching means, said permanent magnet being magnetically attracted to said electromagnet when said electromagnet is magnetically inactive, said permanent magnet having a polar opposite to the polarity of said electromagnet in an active state and being repelled thereby when said electromagnet is magnetically active, said two-way switching means being restored to said first open circuit position by said automatic restoring means when said permanent magnet thereon is repelled by said electromagnet, said electromagnet being magnetically active when said charge indicating means positively indicates that the device is ready to flash, and an improved test circuit comprising, in operative connection, a two-way switch, a photoelectric cell, a trigger circuit and an electro-optic indicating means, said two-way switch of said improved test circuit being normally open and being closed when said two-way switching means is moved to an intermediate position between said first and second positions thereof, said electro-optic indicating means providing an operator with a positive indication in the absence of sufficient ambient light for picture taking without a flash.

* * * * *